United States Patent
Mitchell et al.

(10) Patent No.: US 10,554,256 B2
(45) Date of Patent: Feb. 4, 2020

(54) AIRCRAFT DATA TRANSMISSION MODULES

(71) Applicant: The Boeing Company, Chicago, IL (US)

(72) Inventors: Timothy M. Mitchell, Seattle, WA (US); Anil Kumar, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 13/786,310

(22) Filed: Mar. 5, 2013

(65) Prior Publication Data

US 2014/0254693 A1 Sep. 11, 2014

(51) Int. Cl.
*H04B 3/54* (2006.01)
(52) U.S. Cl.
CPC ..................................... *H04B 3/54* (2013.01)
(58) Field of Classification Search
CPC .. H04B 3/54; H04B 7/18506; B64D 11/0015; B64D 2011/0637
USPC ................. 375/257; 307/9.1; 701/1
See application file for complete search history.

(56) References Cited

U.S. PATENT DOCUMENTS

| | | | |
|---|---|---|---|
| 6,995,658 B2 | 2/2006 | Tustison et al. | |
| 7,893,557 B2 | 2/2011 | Davis et al. | |
| 2001/0009021 A1* | 7/2001 | Ellington et al. | 710/129 |
| 2002/0160773 A1* | 10/2002 | Gresham et al. | 455/431 |
| 2003/0051060 A1* | 3/2003 | Vitenberg | H04L 12/2803 709/250 |
| 2007/0127460 A1* | 6/2007 | Wilber et al. | 370/389 |

(Continued)

FOREIGN PATENT DOCUMENTS

| | | |
|---|---|---|
| CN | 201376671 Y | 1/2010 |
| CN | 102014344 A | 4/2011 |

(Continued)

OTHER PUBLICATIONS

Nguyen, Nha Thanh, et al., Aircraft Data Transmission Using Phase Separation, U.S. Appl. No. 13/897,243, filed May 17, 2013, 43 pgs.

(Continued)

*Primary Examiner* — Sung S Ahn
(74) *Attorney, Agent, or Firm* — Kwan & Olynick LLP (57) ABSTRACT

Provided are methods and systems for terrestrial data transmission between aircrafts and external networks, such as airline and/or airport computer systems. When an aircraft is parked at the gate, the aircraft is connected to and powered by an electrical cable, such as a stinger cable. This cable may be also be used for wired data transmission between the aircraft and the gate using broadband over power line (BPL) technology. The gate and the aircraft are each equipped with a BPL module. The aircraft may include other communication modules, such as a Wi-Fi module, a cellular module, and/or an Ethernet module. These other modules can be also used for data transmission in addition to or instead of communication through the BPL module. A communication link manager may be used to select one or more communication modules depending on availability of communication links, costs, speed, and other parameters.

23 Claims, 6 Drawing Sheets

(56) References Cited

U.S. PATENT DOCUMENTS

| | | | |
|---|---|---|---|
| 2008/0049781 A1* | 2/2008 | Bugenhagen | H04L 12/5692 370/465 |
| 2008/0195259 A1* | 8/2008 | Davis et al. | 701/1 |
| 2008/0217996 A1* | 9/2008 | Niss | 307/9.1 |
| 2008/0259888 A1* | 10/2008 | Terashima | 370/338 |
| 2009/0112569 A1* | 4/2009 | Angus et al. | 703/22 |
| 2011/0099371 A1 | 4/2011 | Roy et al. | |
| 2011/0195656 A1* | 8/2011 | Owyang et al. | 455/3.01 |
| 2012/0099627 A1 | 4/2012 | Mitchell et al. | |
| 2013/0003756 A1 | 1/2013 | Mitchell et al. | |
| 2013/0055321 A1* | 2/2013 | Cline et al. | 725/77 |
| 2013/0244588 A1* | 9/2013 | Pereira | 455/73 |

FOREIGN PATENT DOCUMENTS

| | | |
|---|---|---|
| EP | 2315367 A1 | 4/2011 |
| JP | H7-58675 A | 3/1995 |
| JP | 3133620 U | 7/2007 |
| JP | 2008193305 A | 8/2008 |
| JP | 2008295201 A | 12/2008 |
| WO | 2008097983 A1 | 8/2008 |
| WO | 2011080815 A | 7/2011 |

OTHER PUBLICATIONS

Kumar, Anil, et al., Secure Aircraft Data Transmission Using Multiple Communication Channels, U.S. Appl. No. 14/166,708, filed Jan. 28, 2014, 40 pgs.

"European Application Serial No. 14154459.3, Extended Search Report dated May 2, 2014", 6 pgs.

Shelton, Jason W. et al., "Multiband Wireless Data Transmission Between Aircraft and Ground Systems", U.S. Appl. No. 14/516,668, filed Oct. 17, 2014, 47 pgs.

Shelton, Jason W., "Multiband Wireless Data Transmission Between Aircraft and Ground Systems Based on Availability of the Ground Systems", U.S. Appl. No. 14/516,659, filed Oct. 17, 2014, 48 pgs.

"Chinese Application Serial No. 201410078505.X, Office Action dated Feb. 23, 2018", 24 pgs.

"Japanese Application Serial No. 2014-038775, Office Action dated Jan. 16, 2018", 7 pgs.

"Chinese Application Serial No. 201410078505.X, Office Action dated Nov. 30, 2018", 22 pgs.

"Japanese Application Serial No. 2014-038775, Office Action dated Nov. 27, 2018", 4 pgs.

\* cited by examiner

AIRCRAFT DATA TRANSMISSION MODULES

BACKGROUND

The amount of software and data stored in and collected by onboard aircraft information systems is growing at a rapid pace. The onboard information systems use software and data for various cabin systems, avionics systems, and inflight entertainment systems, among other things. Airlines are responsible for updating the data and software on their aircrafts and timely downloading from the aircraft data collected during one or more previous flights and uploading new data. All these activities require fast data transfers between aircrafts and external networks while the aircrafts are on the ground, e.g., parked at the gates. While such data transfers may be performed over a variety of airport Wi-Fi or cellular links, availability of these links is generally limited to large airports. Furthermore, these links tend to be expensive, unreliable in terms of data transfer speed and connectivity, susceptible to security breaches, and sometimes lacking standardization.

SUMMARY

Provided are methods and systems for terrestrial data transmission between aircrafts and external networks, such as airline and/or airport computer systems. When an aircraft is parked at the gate, the aircraft is connected to and powered by an electrical cable, such as a stinger cable. This cable may be also be used for wired data transmission between the aircraft and the gate using broadband over power line (BPL) technology. The gate and the aircraft are each equipped with a BPL module. The aircraft may include other communication modules, such as a Wi-Fi module, a cellular module, and/or an Ethernet module. These other modules can be also used for data transmission in addition to or instead of communication through the BPL module. A communication link manager may be used to select one or more communication modules depending on availability of communication links, costs, speed, and other parameters.

In some embodiments, a system for terrestrial data transmission between an aircraft and an external network includes a BPL module, at least one wireless communication module, and a communication link manager. The system may be provided on board of an aircraft or provided as a standalone system for installation on an aircraft. For example, the BPL module, the one wireless communication module, and the communication link manager may be configured for fixed attaching to the aircraft. The BPL module is configured to transmit data to and from the external network through an electrical power cable connected to the aircraft and a gate, for example, when the aircraft is parked at the gate and powered using the same electrical power cable. The wireless communication module is configured to wirelessly transmit data to and from the external network. In some embodiments, the aircraft includes other wireless and/or wired communication modules. Furthermore, the system may include a BPL module and a wired communication module and may not include other wireless communication modules. The communication link manager is configured to initiate and control data transmission between the BPL module and the external network and between the at least one wireless communication module and the external network.

The BPL module, the wireless communication module, and the communication link manager may be integrated into a terrestrial off-board communication unit. This unit may be supplied to aircrafts manufacturers and airlines for installation on the aircraft. In some embodiments, the terrestrial off-board communication unit also includes additional communication modules. For example, the terrestrial off-board communication unit may include the following communication modules: a BPL module, a cellular communication module, a Wi-Fi module, and an Ethernet module. Fewer or more communication modules may be provided within the terrestrial off-board communication unit.

In some embodiments, the communication link manager is configured to select one or both of (a) the data transmission between the BPL module and the external network and (b) the data transmission between the at least one wireless communication module and the external network. For example, both data transmission links may be used at the same time. In other embodiments, the communication link manager chooses one of the two communication links and a corresponding communication module. The communication link manager may also change this selection. For example, data transmission may start through one link and then switch to the other link or both links.

The selection of the communication link is performed based on various parameters such as respective costs of data transmission through each communication link as well as availability, security, and speed of each communication link. When a system includes a BPL module and a wireless communication module, the following eight factors may be considered by the communication link manager (a) cost of the data transmission between the broadband over power line module and the external network, (b) cost of the data transmission between the at least one wireless communication module and the external network, (c) availability of the data transmission between the broadband over power line module and the external network, (d) availability of the data transmission between the at least one wireless communication module and the external network, (e) speed of the data transmission between the broadband over power line module and the external network, (f) speed of the data transmission between the at least one wireless communication module and the external network, (g) security of the data transmission between the broadband over power line module and the external network, and (h) security of the data transmission between the at least one wireless communication module and the external network. In some embodiments, the selection is performed automatically by the communication link managers. In other embodiments, the communication link manager outputs information to a user and requests a selection by the user.

In some embodiments, the communication link manager is configured to balance the data load balance between (a) the data transmission between the BPL module and the external network and (b) the data transmission between the at least one wireless communication module and the external network based on changes in the one or more parameters. For example, the system may switch between different communication links and/or use multiple communication links depending on the current state of the parameters.

In some embodiments, the wireless communication module is a cellular communication module or a Wi-Fi module. The system may also include both the cellular communication module and the Wi-Fi module. In some embodiments, the system also includes an Ethernet module, for example, in addition to the cellular communication module or in addition to the Wi-Fi module. In some embodiments, the system includes an Ethernet module, the cellular communication module, and the Wi-Fi module. It should be noted that the system also includes a BPL module in all these examples. In some embodiments, the communication link manager controls the BPL module and all other communication modules that are part of the system and, for example, other communication modules that are not part of the system. Alternatively, one or more communication modules, which are included in the system, are not controlled by the communication link manager. In some embodiments, the system does not include the communication link manager and its functions are distributed among the communication modules and/or performed manually. In some embodiments, the system also includes an interface card for electrically connecting to the electrical power cable and providing inductive coupling or capacitive coupling to the BPL module.

In some embodiments, the system is a part of the aircraft or inclusive of the aircraft. In these embodiments, the BPL module, the wireless communication module, and the communication link manager are fixedly attached to the aircraft. The aircraft may include an electrical power receptacle for connecting to the electrical power cable. The electrical power receptacle may be inductively or capacitively coupled to the BPL. In some embodiments, the aircraft may include an onboard network, and the wireless communication module and the BPL module are communicatively coupled to the on-board network. In some embodiments, the system also includes a common on-board data port communicatively coupled to the wireless communication module and the BPL module. The communication link manager may control communicative coupling to the on-board data port.

In some embodiments, the data transmission between the BPL module and the external network is limited to one or more electrical power components operating at a set frequency. Specifically, these components include the electrical power cable connected to the aircraft and the gate. In some embodiments, these components are limited to components of the aircraft and of the gate. For example, the power supplied to the gate may be at a different frequency. Specifically, the set frequency used for alternating current (AC) to power the aircraft may be about 400 Hz, while the frequency of the AC powering the gate may be about 50 Hz or 60 Hz. A frequency converter may be used at the gate to achieve these different operating regimes. However, data transmission will be limited to the components operating at 400 Hz AC because the data signal will not be able to travel through the frequency converter or other such equipment (e.g., a transformer) without specialized equipment provided (e.g., repeaters).

Provided is another example of a system for terrestrial data transmission between an aircraft and an external network. The system includes the aircraft, gate, and power line cable. The aircraft includes an aircraft BPL module and one or more aircraft communication modules. Each of the aircraft BPL module and the one or more aircraft communication modules is configured to independently transmit data between the aircraft and an external network. The gate includes a gate BPL module communicatively coupled to the external network. The power line cable extends between the aircraft and the gate and is configured to deliver electrical power from the gate to the aircraft. Both the aircraft BPL module and the gate BPL module are inductively coupled to the power line cable and configured to transmit data between the aircraft BPL module and the gate BPL module.

Provided also is a method for terrestrial data transmission between an aircraft and an external network. The method involves providing an aircraft including a set of communication modules. The set includes an aircraft BPL module and one or more aircraft communication modules. The aircraft BPL module is inductively coupled to an electrical receptacle of the aircraft. The method also involves providing a gate having a gate BPL module communicatively coupled to the external network and inductively coupled to an electrical power cable. The method proceeds with connecting the electrical power cable to the electrical receptacle of the aircraft thereby establishing a communication channel between the aircraft BPL module and the gate BPL module. The method then involves selecting one or more modules from the set of communication modules for data communication between the aircraft and the external network and transmitting data between the aircraft and the external network using the one or more identified modules. In some embodiments, selecting the one or more modules is performed by a communication link manager provided on the aircraft using one or more of the following parameters: cost of data transfer through each communication module in the set, availability of data transfer through each communication module in the set, speed of data transfer through each communication module in the set, and security of data transfer through each communication module in the set. In some embodiments, transmitting data between the aircraft and the external network is performed using at least two identified modules.

These and other embodiments are described further below with reference to the figures.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Data transfer between aircrafts and external networks, such as airport networks, airline networks, and other types of terrestrial networks, is essential in modern aviation. Data collected during prior flights may need to be downloaded from an aircraft for processing, while new data needs may need to be uploaded for future flights. Often the ground time of an aircraft is limited, while significant amounts of data need to be transferred to and from the aircraft in an efficient, secure, and robust manner. Wi-Fi and cellular technologies have been proposed and partially adopted by various airports and airlines. However, these technologies are often inconsistent or even unavailable due to technical, business, and regulatory complexities of the airline industry. For example, different designs of existing and new aircrafts make it difficult to integrate antennas for wireless communications as well as to provide new connectors and communication interfaces. Furthermore, communication frequency bandwidths available for commercial uses are often inconsistent in different countries and require different equipment. As such, the growth of broadband connectivity has been very slow and insufficient to support growing demands. Many airports and airlines still rely on paper systems and data carriers, such as tapes or disks, which are physically carried from and to aircrafts during their ground time.

At the same time, some other areas of the airline industry have gone through a rather successful standardization. One such area is electrical power supply to aircrafts, while the aircrafts are parked by the gates at airports. A standard electrical power cable is used for essentially all types of commercial aircrafts, such as Boeing 707 through Boeing 787 and Airbus 300 through A380. This electrical power cable is sometimes referred to as a stinger cable. In some embodiments, this cable is used to supply an electrical power using an alternating current (AC) at 110V and 400 Hz. However, other types of electrical and other cables used in the airline industry for making connections to aircrafts are within the scope as well.

Due to this standardization and direct connectivity to aircrafts, these electrical power cables can be also used as a medium for wired data transmission. Specifically, two broadband over power line (BPL) modules may be communicatively (and electrically) interconnected by an electrical power cable. In some embodiments, other components of the electrical power supply system may be used to form this connection between two BPL modules. One of these BPL modules is positioned on the aircraft and may be referred to as an aircraft BPL module. The other BPL module may be provided on the ground, e.g., at the gate or some other part of the electrical power supply system, and may be collectively referred to as a gate BPL module. The two BPL modules may be configured to provide data transfer between the aircraft and, for example, the gate using various BPL protocols, such as IEEE1901/ITU-TG.hn. This data transfer may be referred to as BPL data transfer to distinguish from other possible data transfers.

The gate BPL module may be communicatively coupled to an external network using one or more communication modules provided at the gate or other location of the gate BPL module. Each of these communication modules may provide a separate external communication link between the gate BPL module and the external networks. Some examples of these communication modules include an Ethernet module, a Wi-Fi module, and a cellular module. One, two, or more modules may be used for these purposes. The number and types of these communication modules may be chosen based on the airport infrastructure. When multiple communication modules are connected to the gate BPL module, two or more modules may be used for data transfer between the gate BPL module and the external networks.

The aircraft BPL module may be connected to an onboard aircraft network. In some embodiments, two or more other aircraft communication modules, such as an Ethernet module, a Wi-Fi module, and a cellular module, may be connected to the onboard aircraft network and provide data transfer to the one or more external networks. This data transfer provided by the other aircraft communication modules may be in addition to or instead of data transfer provided between the two BPL modules or, more generally, independent of data transfer provided between the two BPL modules. In other words, an aircraft may have one BPL communication link and one or more other communication links. Any number or combinations of these communication links can be used at the same time and/or in sequence. For example, a Wi-Fi module on the aircraft may be connected to the Gatelink system available in some airports and used for transmission of all data between the aircraft and the external network. In this example, no data transfer is performed by the aircraft BPL module and, as a result, by the gate BPL module or the electrical power cable. In another example, a Wi-Fi module on the aircraft may be also connected to the Gatelink system and used for transmission of some data between the aircraft and the external networks. The remaining data may be transmitted through the gate BPL module. The two data streams may be performed in parallel, in sequence, or various combinations of the two schemes.

The selection of different communication links may be performed by a communication link manager. The communication link manager may analyze various parameters associated with each link, such as availability, speed, security, costs, and the like, and select a link or multiple links for data transmission and, in some embodiments, an order of using the selected multiple links. For example, highly secure data may be transmitted over one link using, e.g., a BPL module, while less secure data may be transmitted using another link, e.g., a Wi-Fi module.

Providing multiple data transfer options on the same aircraft allows choosing among these options based on the parameters listed above instead of relying on a single communication link that may or may not be available. For example, some airports may have a robust Wi-Fi connectivity but may be slow to adopt BPL data transfer options. Furthermore, data may need to be transferred when the airplane is not connected to the electrical power supply at the gate and wireless communication links have to be used. Communication links may be also temporary unavailable for various reasons. In one example, some data transfer may require secure communication links, while remaining data may be transferred using the least expensive methods. In yet another example, multiple data links may be used in parallel to ensure that large amounts of data are transferred between the aircraft and external network in a short period of time (e.g., during a short time on the ground between two flights). The same examples and considerations are applicable for data transfer between the gate and external network or, more specifically, between the gate BPL module and external network.

The methods and system described herein provide an alternative mode of data transfer using BPL links that ensures high speed and robust data transfer in addition to or instead of using other types of communication links. The BPL data transfer may be used by airlines to avoid high operating costs often imposed by airport authorities for use of their Wi-Fi networks and roaming charges from various cellular service providers operating at different airports. Furthermore, security of the BPL data transfer is ensured by limited propagation of data signals. The data signal is constrained by various power system components, such as transformers and frequency converters, and therefore is bound within a controlled area of the airport. For example, 50 Hz or 60 Hz alternating current (AC) is often supplied to a gate. The gate may be equipped with a solid state converter to convert this incoming AC into 400 Hz AC to be supplied to an aircraft. The data signal cannot propagate through the converter unless a data repeater is provided. In some situations, 400 Hz AC is supplied by a central airport system but rarely, if ever, the 400 Hz AC lines extend beyond the airport geographical limits. Unlike airwaves used for Wi-Fi and cellular communication that propagate through public areas at the airport and beyond the airport limits, access to 400 Hz AC lines or other like lines is restricted, which adds to the physical security of the BPL data transfer.

Examples of Data Transfer Systems

Figure 1:
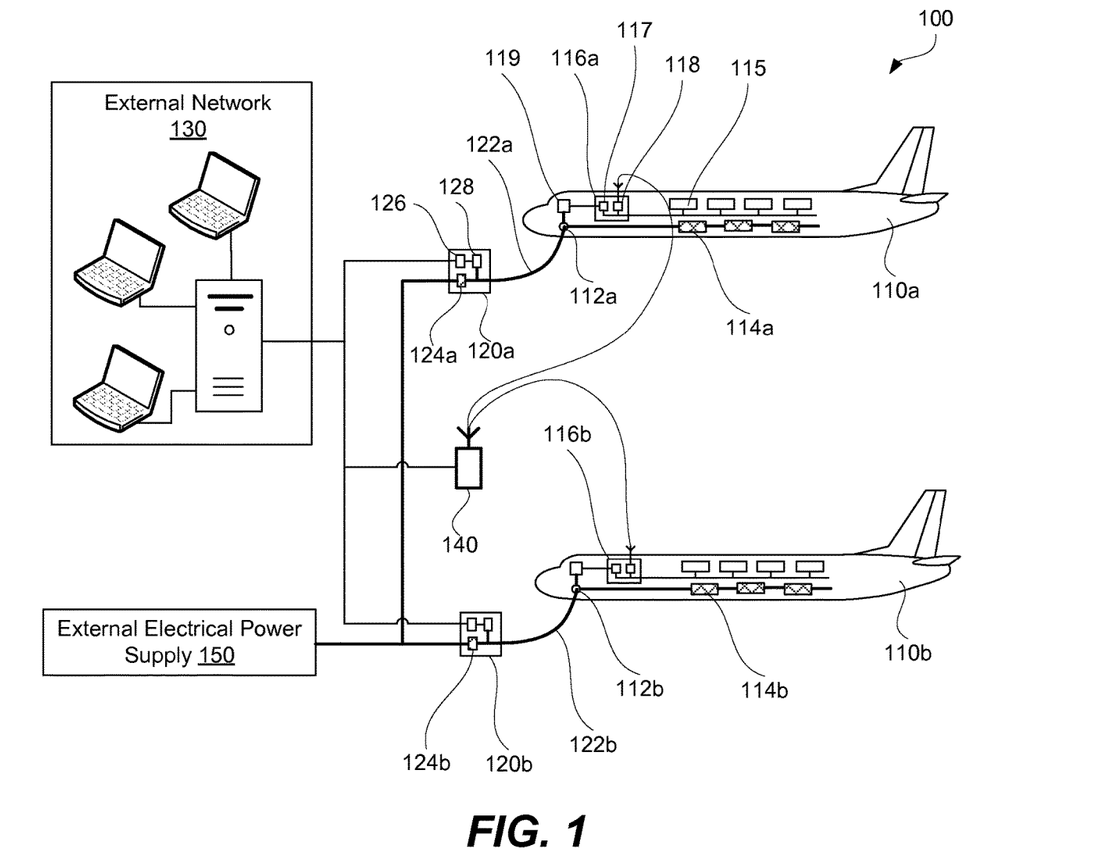
FIG. 1 is a schematic representation of a system for terrestrial data transmission between an aircraft and an external network, in accordance with some embodiments.

FIG. 1 is a schematic illustration of a system 100 for terrestrial data transmission between an aircraft and an external network, in accordance with some embodiments. Illustrated are aircrafts 110a and 110b communicatively coupled to an external network 120 using various components of system 100. One having ordinary skills in the art would understand that any number of aircrafts (e.g., one, two, three, or more) may be communicatively coupled to the same or different external networks using the same system.

Aircrafts 110a and 110b are shown parked at their respective gates 120a and 120b and connected to gates 120a and 120b to receive electrical power. Specifically, aircraft 110a is shown to be connected to gate 120a using an electrical power cable 122a, while aircraft 110b is shown to be connected to gate 120b using an electrical power cable 122b. Aircrafts 110a and 110b may have electrical receptacles 112a and 112b for making connections to electrical power cables 122a and 122b. Electrical power cables 112a and 122b may be standardized power cables suitable for different aircrafts types. Specific examples of such cables include a stinger cable, which is an insulated, flexible, all weather extension cord used to supply 3 phase, 400 Hz, 115 VAC electrical power to aircrafts while they are on the ground, e.g., parked at the gate. It can supply several hundred amps of electrical current to the aircraft from the ground power grid and may be about 50 feet in length and nearly 2 inches in diameter. As noted above, standardization of electrical power cables 112a and 122b and electrical receptacles 112a and 112b allows connecting a diverse aircraft fleet using the same type of a cable. Furthermore, standardized electrical power may be used to power aircrafts 110a and 110b, such as using AC at 110V/400 Hz. This electrical power is typically different from electrical power used within airports for other purposes and outside of the airports. For example, a general power source at the airport may provide 110V/50 Hz AC. This general power AC may be converted to 110V/400 Hz at gates 120a and 120b or within the airport and supplied to aircrafts 110a and 110b at this frequency. The 110V/400 Hz AC is typically not used for any other purposes other than powering aircrafts 110a and 110b, which helps to maintain data security as further described below.

FIG. 1 illustrates an example in which an external power supply 150 provides an electrical power using AC at a frequency (e.g., 50 Hz or 60 Hz) that is different than the frequency of AC used in electrical power cables 122a and 122b. A frequency converter may be performed at gates 120a and 120b using specific converters 124a and 124b, such as solid state frequency converters. Furthermore, a current provided by external power supply 150 may have a different voltage than the current used in electrical power cables 122a and 122b, and gates 120a and 120b may be equipped with transformers.

Each aircraft is equipped with two or more communication modules, which may or may not be integrated into a terrestrial off-board communication unit (TOCU). FIG. 1 illustrates TOCU 116a on board of aircraft 110a and TOCU 116b on board of aircraft 110b. At least one of the communication modules provided on each aircraft is a BPL communication module. The other communication modules may be Wi-Fi modules, cellular modules, and/or Ethernet modules. These modules will now be explained with reference to aircraft 110a. One having ordinary skills in the art would understand that other aircrafts may have the same set of communication modules or different sets. However, each set includes a BPL communication module and at least one other module. Because these BPL communication modules are located onboard of aircrafts they may be referred to as aircraft BPL modules or on-board BPL modules to distinguish them from ground-based BPL communication modules, which may be referred to as gate BPL modules or off-board BPL modules.

Aircraft 110a includes aircraft BPL module 117 and another communication module 118, which will be referred to as a second module. FIG. 1 schematically illustrates wireless communication between second module 118 and a data service provider 140. However, other forms of communication are within the scope as well. For example, an Ethernet cable may be directly connected to an aircraft in some situations.

FIG. 1 illustrates only one second module 118 positioned on aircraft 110b. In some embodiments, an aircraft may include additional one or more communication module. For example, an aircraft may include a BPL module, one or more wireless modules (e.g., Wi-Fi modules, cellular modules), and, in some embodiments, one or more wired modules (e.g., Ethernet modules). Various combinations and arrangements of these modules (e.g., integrated in a TOCU or standalone modules) are described below.

Second module 118 may be used to connect to data service provider 140 that provides further connection to external network 130. Internet and/or other types of networks may be used for data transfer between data service provider 140 and external network 130. Data service provider 140 may be a part of the airport infrastructure, e.g., Gatelink, or independent data provider, e.g., a cell phone company. It should be noted that in the case of wireless service, the communication link and data transfer may occur even when aircraft 110a is not parked at the gate. This communication link may be, for example, used for urgent information while aircraft 110a is still directed to gate 120a after landing or after aircraft 110a left gate 120a.

BPL module 117 is used for data transfer through electrical power cable 122a. Specifically, BPL module 117 is connected to electrical power cable 122a through an interface card 119 configured to separate data signals from electrical power cable 122a. Interface card 119 may utilize inductive coupling or capacitive coupling. As such, interface card 119 is also exposed to a voltage and frequency used for the electrical power transmission. In some embodiments, an interface card is integrated into BPL module 117.

BPL links are created by impressing a modulated carrier signal on a portion of the electrical power system extending between the aircraft and gate and including the electrical power cable. Different frequency bands may be used depending on the transmission distance and data rates requirements, such as between about 1 kHz and 100 MHz or more specifically between 2 MHz and 50 MHz. Because the electric current used to power the aircraft and the electrical current used for data transmission use different frequencies, the two currents do not interfere with each other. The data transfer rates may be at least about 15 Mbit per second or, more specifically, at least about 65 Mbit per second. In some embodiments, the data transfer rates are between about 30 Mbit per second and 300 Mbit per second.

The BPL transmission protocol may follow one of the established or developing standards, such as IEEE 1901 or ITU-T's G.hn specification. For example, one or two of the following physical layers may be used in a protocol, e.g., a fast Fourier transform orthogonal frequency-division multiplexing modulation layer, and a wavelet orthogonal frequency-division multiplexing modulation layer. The first one of these layers may include a forward error correction scheme based on a convolutional turbo code. The second one of these layers may include a mandatory forward error correction based on a concatenated Reed-Solomon and convolutional code. On top of these two physical layers, one or more media access control (MAC) layers may be defined. For example, one MAC layer may be used for local networking, while another one may be used for access networking. To manage coexistence of multiple physical layers and MAC layers, an inter-system protocol may be used. The protocol may be used so that various BPL devices, such as the gate BPL module and the aircraft BPL module, can share communication resources, such as frequency/time, when installed a common electrical wiring is used in Orthogonal Frequency Division Multiplexed (OFDM) and Time Division Multiple Access (TDMA) modulation schemes.

Gate 120a, to which aircraft 110a is connected by electrical power cable 122a, also includes a BPL module 126 or, more specifically, gate BPL module 126. In some embodiments, gate BPL module 126 may not be a part of gate 120a, in particular, when the electrical power is not being converted (frequency, voltage) at gate 120a. In this case, the data signal may propagate past gate 120a without a need for any additional equipment, such as repeaters, at gate 120a. However, because of very specific characteristics of power supplied to aircraft 110a, power conversion is still performed within the bounds of the airport. As such, the data signal travels only within the restricted territory of the airport and cannot be easily accessed.

Gate BPL module 126 may be connected to external network 130 and capable of exchanging data with other devices and systems that are connected or parts of this network. For example, external network 130 may be a controlled network within the airport or a part of the Internet. Various connection schemes and technologies may be used for this part of data exchange, i.e., between Gate BPL module 126 and external network 130. For example, gate 120a may include other communication modules, such as an Ethernet module, a Wi-Fi module, and/or a cellular module for connecting to external network 130 as further described below with reference to FIG. 3. The gate communication modules should be distinguished from aircraft communications modules even though they may have similar types. For example, both aircraft 110a and gate 120a may have cellular modules for connecting to external network 130. Likewise, both aircraft 110a and gate 120a may have Wi-Fi modules for connecting to external network 130. Both aircraft 110a and gate 120a may have Ethernet modules for connecting to external network 130. Gate 120a may also include an interface card 128 for connecting gate BPL module 126 to power cable 122a. In some embodiments, interface card 128 is integrated into gate BPL module 126.

Aircraft BPL module 117 and gate BPL module 126 are configured to exchange data when electrical power cable 122a is connected to electrical power socket 112a of aircraft 110a. As such, when electrical power cable 122a is connected to electrical power socket 112a, the same cable may be used for supplying electrical power to aircraft 110a and for transferring data between aircraft 110a and external network 130. The two processes are independent from each other, such that power may be supplied without data transfer and data may be transferred without supplying power.

The BPL communication links may be configured to provide relatively secure data transfer in comparison to other types of communication links that are currently available in the airport environment. Specifically, data signals transferred through the BPL links are restricted to electrical power cables 122a and 122b and a few other power supply components that operate at certain frequency. All of these components are located within airport areas having restricted access. Other power lines extending through the airport and operating at a different voltage and/or at a different frequency than electrical power cables 122a and 122b will not carry the data signal. Any power lines used for an upstream supply of power to electrical power cables 122a and 122b may be effectively shielded from the data signals by virtue of using different frequencies and/or voltages. In other words, the data signals are blocked by frequency converters, transformers, and other like components. As such, the data signals are effectively contained within a small portion of power lines used in the airports. Security within BPL links may be further enhanced by encryption and other like technologies.

Furthermore, physical access to gate BPL module 126 and/or cables 122a may be restricted. The physical access may be restricted by secure enclosures that require successful authentication, via credentials, multi-factor crew authentication, digital keys, passcodes, RFID, biometrics, etc., to gain physical access to these modules and cables. In some embodiments, gate BPL module 126 and/or cable 122a may include GPS receivers for verifying that module 126 and cable 112a have not been moved from a pre-determined position. Furthermore, gate BPL module 126 may be configured with a secure routing table that facilitates routing information via external network 130 using pre-determined hops and/or pre-determined destinations. Gate BPL modules 126 may be identified and/or addressed by a hardware identifier such as a MAC address. In some embodiments, gate BPL module 126 may include various computer system components, such as output devices and ports (e.g., a display), input devices (e.g., a keyboard, touch screen, mouse), a memory (e.g., tangible computer readable memory). Furthermore, gate BPL module 126 may include a communication link manager for selecting a communication link between each of gate BPL module 126 and external network 130.

Various servers may be a part of or connected to external network 130, such as airline servers, airport servers, aircraft service provider servers, aircraft manufacturer servers, and the like. These servers may be connected to external network 130 via a LAN, WAN, and/or the Internet. These servers may be configured to provide and receive data to and from aircrafts 110a and 110b. For example, the servers may provide software and/or firmware updates to components of aircrafts 110a and 110b, such as cabin systems software, flight bag, and avionics software. The servers may also provide content, such as music and movies, for in-flight entertainment systems on aircraft 110a and 110b. External network 130 may also provide communication between aircrafts 110a and 110b.

Examples of Different Communication Links

Figure 2:
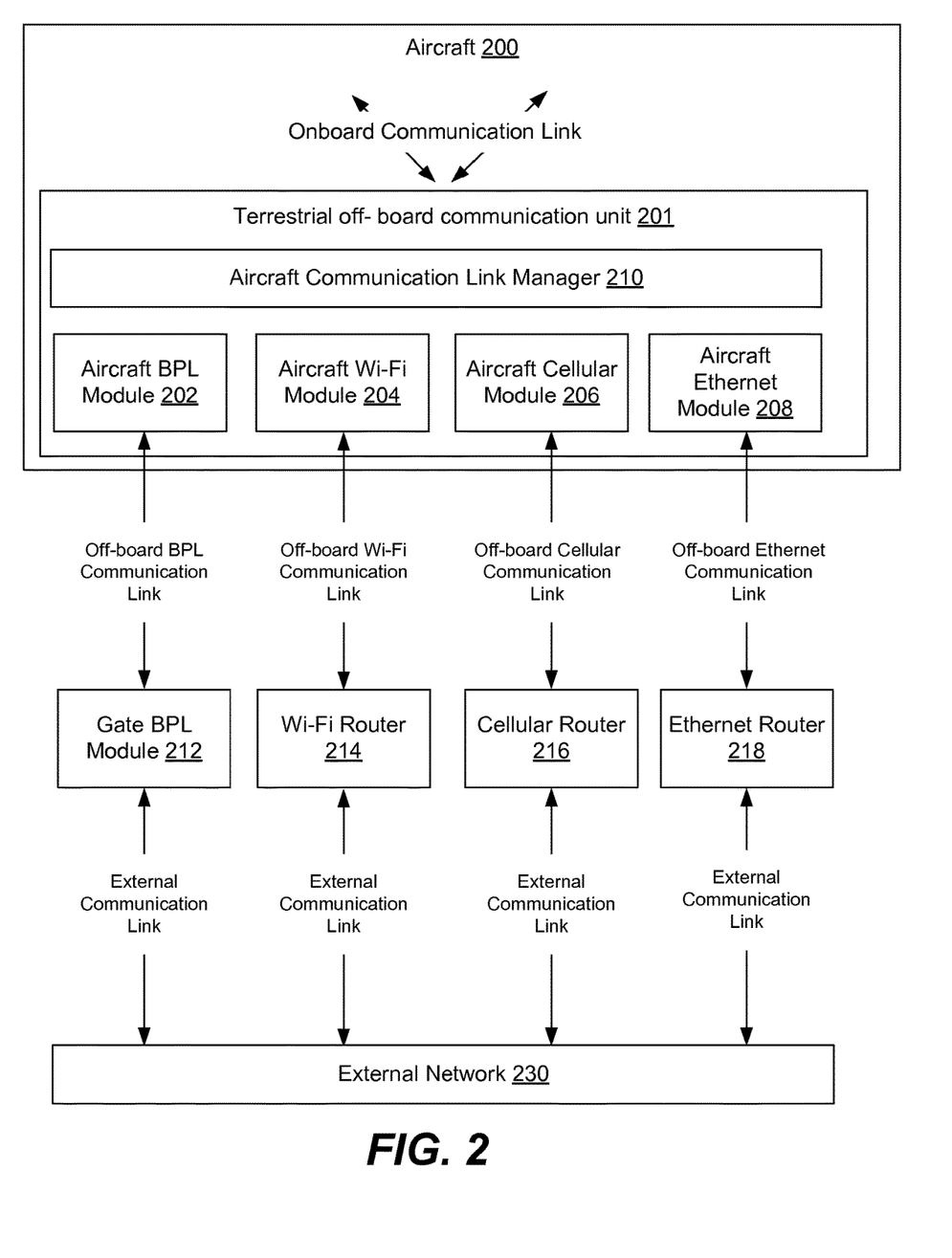
FIG. 2 is a schematic representation of different communications links for data transmission between an aircraft and an external network, in accordance with some embodiments.

As noted above, a set of different communication links may be used for data transfer between an aircraft and an external network and yet another set of communication links may be used for data transfer between a gate BPL module and the external network. These communications links will not be explained with reference to FIGS. 2 and 3. Specifically, FIG. 2 is a schematic representation of different communications links for data transmission between an aircraft 200 and an external network 230, in accordance with some embodiments. Aircraft 200 includes an aircraft BPL module 202 and at least one other module. FIG. 2 illustrates three other modules, an aircraft Wi-Fi module 204, an aircraft cellular module 206, and an aircraft Ethernet module 208. However, fewer or more communication modules may be provided on aircraft 200. Communication modules 202-208 are shown integrated into a terrestrial off-board communication unit 201. In some embodiments, BPL module 202 may not be integrated with other modules and may function as a part of a standalone system. Aircraft 200 or, more specifically, terrestrial off-board communication unit 201 may also include an aircraft communication link manager 210, which is configured to initiate and control data transmission between one or more of communication modules 202-208 and external network 230. For example, aircraft communication link manager 210 may instruct aircraft BPL module 202 to form an off-board BPL communication link with gate BPL module 212. In the same or another example, aircraft communication link manager 210 may instruct aircraft Wi-Fi module 204 to form an off-board Wi-Fi communication link with Wi-Fi router 214, such as a router of the Gatelink system. Furthermore, aircraft communication link manager 210 may instruct aircraft cellular module 206 to form an off-board cellular communication link with a cellular router 216, such as a router of a cell phone service provider. Finally, aircraft communication link manager 210 may instruct aircraft Ethernet module 206 to form an off-board Ethernet communication link with an Ethernet router 218, which may be a router provided by the airport or airline. Each one of these external communication modules or routers, e.g., gate BPL module 212, Wi-Fi router 214, cellular router 216, and Ethernet router 218, may be capable of establishing separate external communication links with external network 230. In some embodiments, one or more of these external communication modules or routers, e.g., gate BPL module 212, Wi-Fi router 214, cellular router 216, and Ethernet router 218, may not be available and corresponding off-board communication links and external communication links cannot be established. Furthermore, even if one of these external communication modules or routers is available, aircraft communication link manager 210 may choose not to use the corresponding communication links because of various parameters associated with these links, such as cost, security, availability, and speed.

Figure 3:
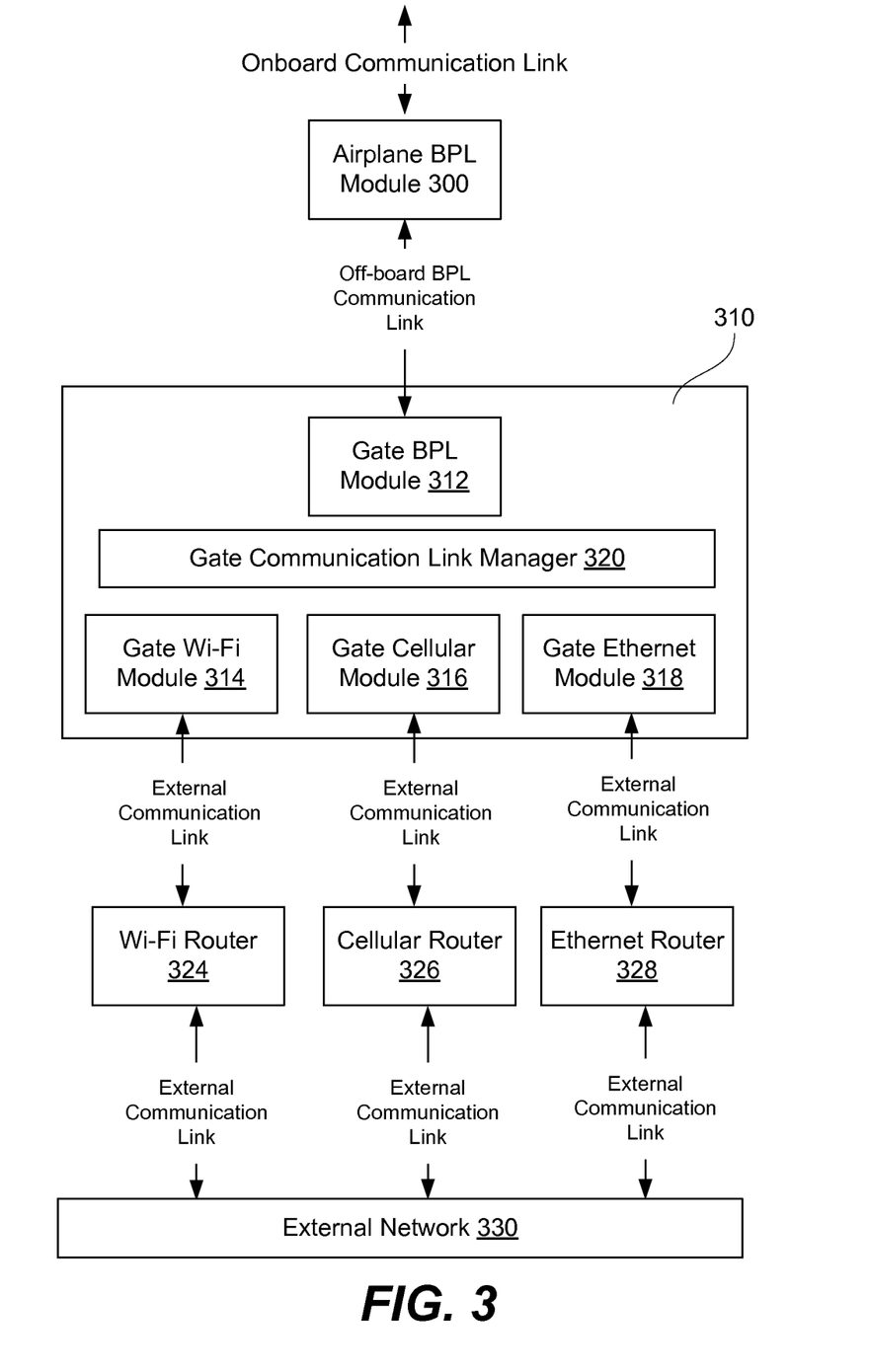
FIG. 3 is a schematic representation of different communications links for data transmission between a gate and an external network, in accordance with some embodiments.

Various examples of the external communication link established between gate BPL module 212 and external network 230 will now be described with reference to FIG. 3. Specifically, FIG. 3 is a schematic representation of different communications links for data transmission between a gate 310 and an external network 330, in accordance with some embodiments. Gate 310 includes a gate BPL module 312 for establishing an off-board BPL communication link with airplane BPL module 300 as described above. Gate 310 may include two or more other communication modules, such as gate Wi-Fi module 314, gate cellular module 316, and gate Ethernet module 318. These gate communication modules should be distinguished from aircraft communication modules that have a similar names, e.g., a gate Wi-Fi module is different from an aircraft Wi-Fi module. While aircraft communication modules are configured to transmit data in addition to or instead of the aircraft BPL module or, more specifically, to transmit data that is not transmitted by the aircraft BPL module, the gate communication modules are configured to transmit data that went through the aircraft BPL module and the gate BPL module. FIG. 3 illustrates three gate communication modules other than gate BPL communication module 312. However, fewer or more communication modules may be provided on aircraft 200.

Gate 310 may also include a gate communication link manager 320, which is configured to initiate and control data transmission between one or more of communication modules 314-318 and external network 330. For example, gate communication link manager 320 may instruct gate Wi-Fi module 314 to form an external Wi-Fi communication link with Wi-Fi router 324, such as a router of the Gatelink system. Furthermore, gate communication link manager 320 may instruct gate cellular module 316 to form an external cellular communication link with a cellular router 326, such as a router of a cell phone service provider. Finally, gate communication link manager 320 may instruct gate Ethernet module 318 to form an external Ethernet communication link with an Ethernet router 318, which may be a router provided by the airport, airline, or some third party (e.g., a communication company). These external communication routers may be the same or similar to the routers described above with reference to FIG. 2, i.e., Wi-Fi router 214, cellular router 216, and Ethernet router 218. In some embodiments, one or more of these external communication routers may not be available and corresponding external communication links cannot be established. Furthermore, even if one of these external communication routers is available, gate communication link manager 320 may choose not to use the corresponding communication links because of various parameters associated with these links, such as cost, security, availability, and speed. In some embodiments, the same external communication router may be used directly by the aircraft and separately by the gate to transmit separate data streams from the same aircraft.

Examples of Data Transfer Methods

Figure 4:
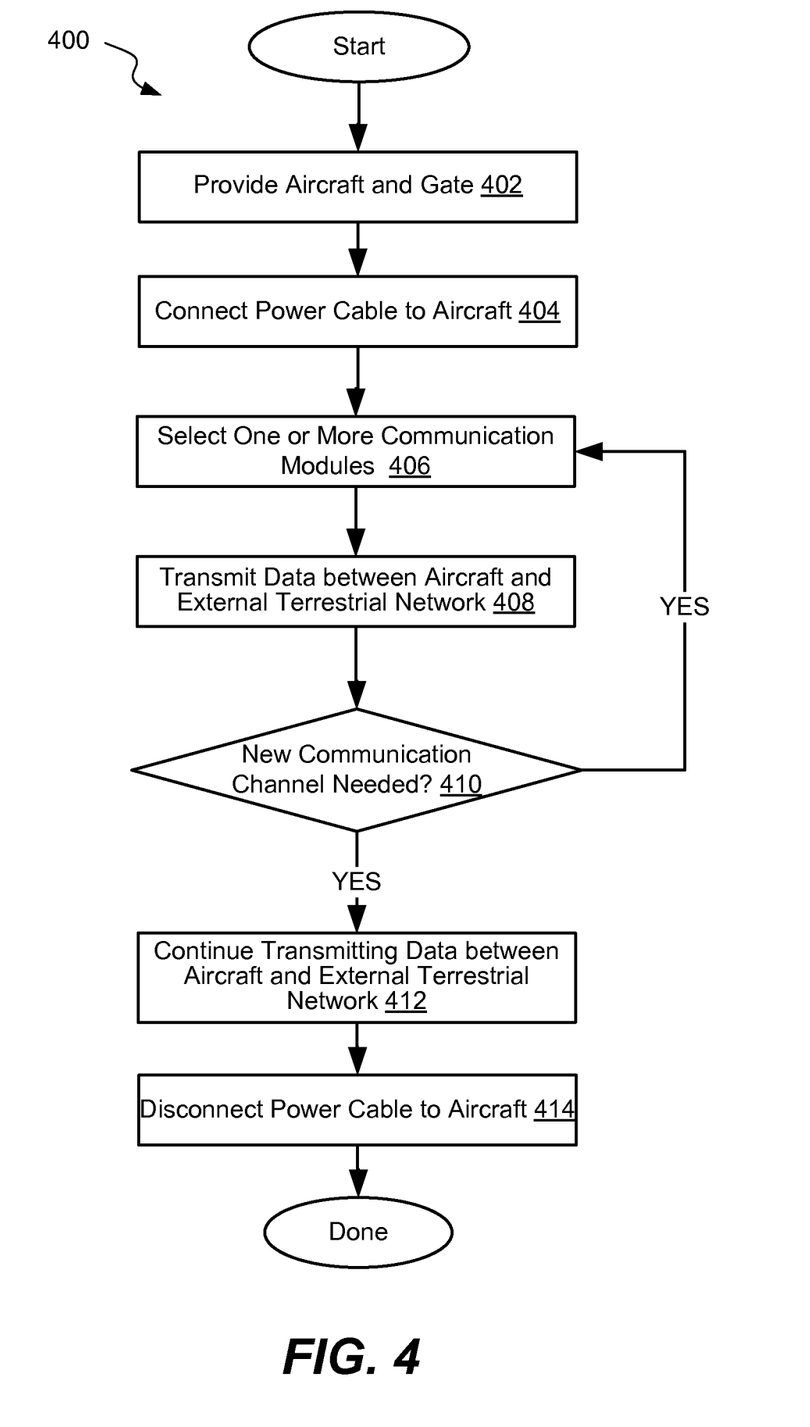
FIG. 4 is a process flowchart corresponding to a method for terrestrial data transmission between an aircraft and an external network, in accordance with some embodiments.

FIG. 4 is a process flowchart corresponding to a method 400 for data transmission between an aircraft and an external network, in accordance with some embodiments. Method 400 may start with providing an aircraft and a gate during operation 402. Various examples of aircrafts and gates are described above with reference to FIGS. 1-3. The provided aircraft includes a set of multiple communication modules. At least one module in this set is an aircraft BPL module. The BPL module is coupled to an electrical receptacle of the aircraft. The provided gate includes a gate BPL module that is communicatively coupled to the external network. The gate BPL module is also coupled to the electrical power cable. For example, an interface card may be used to provide inductive or capacitive coupling between the gate BPL module and the electrical power cable. The aircraft may be parked at the gate such that the electrical power cable may be connected to the electrical receptacle of the aircraft. Furthermore, the location of the aircraft may allow one or more aircraft communication modules (other than the BPL module) to establish communication links with various data service providers available in that location.

Method 400 may proceed with connecting the electrical power cable to the electrical receptacle of the aircraft during operation 404. This connection establishes a communication link between the aircraft broadband over power line module and the gate broadband over power line module. The electrical power may be supplied through this cable during later operations of method 400 or not.

Method 400 may proceed with operation 406, during which one or more aircraft communication modules are selected from the set for data communication between the aircraft and the external network. The selection may be performed manually (e.g., by a pilot or other personnel on the board of the aircraft) or automatically (e.g., by a communication link manager). Various parameters associated with each communication link may be evaluated, such as cost, security, availability, and speed. Method 400 may proceed with transmitting data between the aircraft and the external network using the one or more identified modules during operation 408. At some point during execution of method 400, a new communication channel may be needed as reflected by decision block 410. For example, a different type of data (e.g., more secure data) may need to be transmitted or the original communication link may fail. In this case, method 400 may involve repeating operation 406, during which the same or another one or more aircraft communication modules are selected. Operation 408 is also repeated. If a new communication channel is not needed (as reflected by decision block 410), then method continues with transmitting data between the aircraft and external networks during operation 412.

At some point during execution of method 400, the electrical power cable may be disconnected from the aircraft as reflected by operation 414 in FIG. 4. It should be noted that if data was transmitted over the BPL link, the transmission of the data is stopped prior to or at beginning of operation 414. However, if other types of communication links are used, then the transmission of the data may continue during and after operation 414. For example, data transmission through wireless communication links may be continued during and after operation 414.

Examples of Aircrafts

Figure 5:
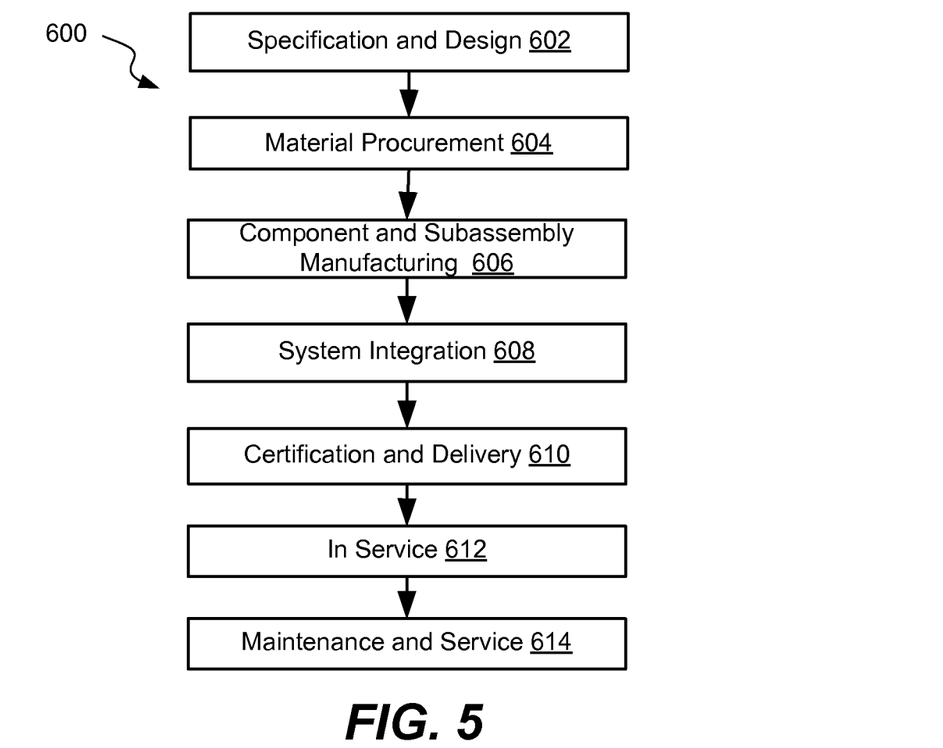
FIG. 5 is a process flowchart reflecting key operations in aircraft manufacturing and service, in accordance with some embodiments.

An aircraft manufacturing and service method 600 shown in FIG. 5 and an aircraft 630 shown in FIG. 6 will now be described to better illustrate various features of processes and systems presented herein. During pre-production, aircraft manufacturing and service method 600 may include specification and design 602 of aircraft 630 and material procurement 604. The production phase involves component and subassembly manufacturing 606 and system integration 608 of aircraft 630. Thereafter, aircraft 630 may go through certification and delivery 610 in order to be placed in service 612. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

Figure 6:
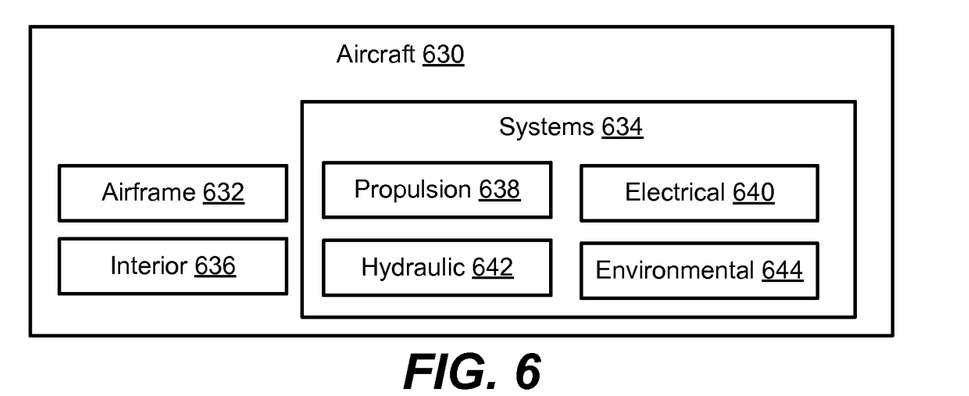
FIG. 6 is a block diagram illustrating various key components of an aircraft, in accordance with some embodiments.

As shown in FIG. 6, aircraft 630 produced by aircraft manufacturing and service method 600 may include airframe 632, interior 636, and multiple systems 634 and interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 600. For example, without limitation, components or subassemblies corresponding to component and subassembly manufacturing 606 may be fabricated or manufactured in a manner similar to components or subassemblies produced while aircraft 630 is in service.

Also, one or more apparatus embodiments, method embodiments, or a combination thereof may be utilized during component and subassembly manufacturing 606 and system integration 608, for example, without limitation, by substantially expediting assembly of or reducing the cost of aircraft 630. Similarly, one or more of apparatus embodiments, method embodiments, or a combination thereof may be utilized while aircraft 630 is in service, for example, without limitation, to maintenance and service 614 may be used during system integration 608 and/or maintenance and service 614 to determine whether parts may be connected and/or mated to each other.

Examples of Controller Computer Systems

Figure 7:
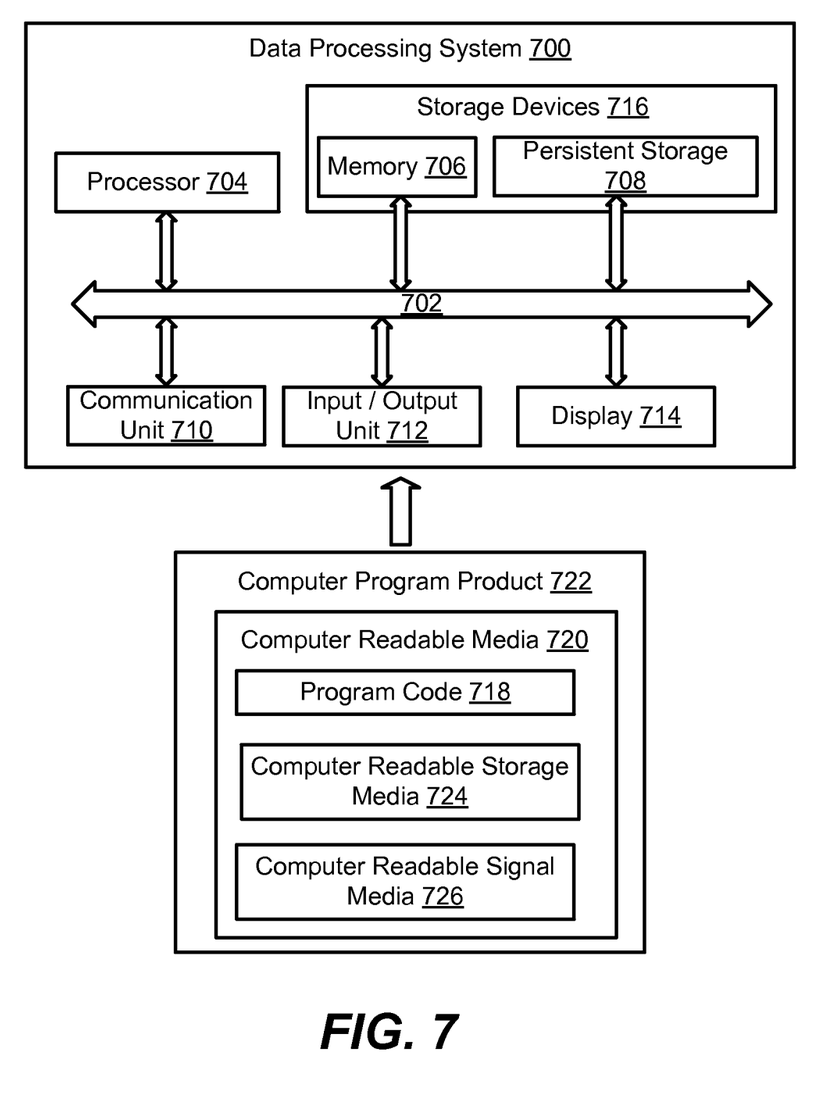
FIG. 7 is a block diagram illustrating a data processing system, in accordance with some embodiments.

Turning now to FIG. 7, an illustration of a data processing system 700 is depicted in accordance with some embodiments. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A system for terrestrial data transmission between an aircraft and an external network, the system comprising:
   a broadband over power line module, configured to transmit data to and from the external network through an electrical power cable, when the electrical power cable is connected to the aircraft and a gate, using a broadband over power line communication link;
   a wireless communication module, configured to wirelessly transmit data to and from the external network using a wireless communication link; and
   a communication link manager, configured to initiate and control data transmission between the broadband over power line module and the external network using the broadband over power line communication link and between the wireless communication module and the external network using the wireless communication link based on propagation of a broadband over power line signal at the gate, wherein the communication link manager is further configured to choose whether to use the wireless communication module, the broadband over power line module, or a combination of the two, the choosing being based upon a variety of parameters including availability, speed, security, and costs, and wherein the communication link manager is further configured to, if the combination of the two is chosen, determine an order of using the wireless communication module or the broadband over power line module based on the variety of parameters,
   wherein the communication link manager is configured to select a frequency band for the broadband over power line communication link based on a length of the electrical power cable and based on a data rate transfer expected through the broadband over power line communication link.

2. The system of claim 1, wherein the broadband over power line module, the wireless communication module, and the communication link manager are integrated into a terrestrial off-board communication unit of the aircraft.

3. The system of claim 1, wherein the communication link manager is configured to select one or both of (a) the data transmission between the broadband over power line module and the external network and (b) the data transmission between the wireless communication module and the external network.

4. The system of claim 3, wherein the communication link manager is configured to select one or both of (a) the data transmission between the broadband over power line module and the external network and (b) the data transmission between the wireless communication module and the external network based on parameters selected from the group (a) cost of the data transmission between the broadband over power line module and the external network, (b) cost of the data transmission between the wireless communication module and the external network, (c) availability of the data transmission between the broadband over power line module and the external network, (d) availability of the data transmission between the wireless communication module and the external network, (e) speed of the data transmission between the broadband over power line module and the external network, (f) speed of the data transmission between the wireless communication module and the external network, (g) security of the data transmission between the broadband over power line module and the external network, and (h) security of the data transmission between the wireless communication module and the external network.

5. The system of claim 4, wherein the selection of one or both of (a) the data transmission between the broadband over power line module and the external network and (b) the data transmission between the wireless communication module and the external network is performed automatically.

6. The system of claim 4, wherein the communication link manager is configured to balance data transfer load between (a) the data transmission between the broadband over power line module and the external network and (b) the data transmission between the wireless communication module and the external network based on changes in the one or more parameters.

7. The system of claim 1, wherein the wireless communication module comprises a module selected from the group consisting of a cellular communication and a Wi-Fi module.

8. The system of claim 1, further comprising an interface card for electrically connecting to the electrical power cable and establishing an inductive coupling or a capacitive coupling to the broadband over power line module.

9. The system of claim 1, further comprising the aircraft and wherein the broadband over power line module, the wireless communication module, and the communication link manager are fixedly attached to the aircraft.

10. The system of claim 9, wherein the aircraft comprises an electrical power receptacle for connecting to the electrical power cable and wherein the electrical power receptacle is inductively coupled to the broadband over power line.

11. The system of claim 9, wherein the aircraft comprises an onboard network and wherein the wireless communication module and the broadband over power line module are communicatively coupled to the onboard network.

12. The system of claim 1, further comprising a common on-board data port communicatively coupled to wireless communication module and the broadband over power line module.

13. The system of claim 1, wherein the data transmission between the broadband over power line module and the external network is limited to one or more electrical power components operating at a set frequency, wherein the one or more electrical components comprise the electrical power cable connected to the aircraft and the gate.

14. The system of claim 13, wherein the set frequency is about 400 Hz.

15. The system of claim 1, wherein the broadband over power line module, the wireless communication module, and the communication link manager are configured for fixed attaching to the aircraft.

16. The system of claim 1, wherein the communication link manager is configured to instruct the wireless communication module to form the wireless communication link and transmit data over the wireless communication link and not over the broadband over power line communication link when the broadband over power line communication link is available.

17. The system of claim 1, wherein the communication link manager is configured to instruct the wireless communication module to form the wireless communication link and transmit data over the wireless communication link based on security of the data transmission between the broadband over power line module and the external network.

18. The system of claim 1, wherein the communication link manager is further configured to analyze parameters of the broadband over power line communication link and the wireless communication link and select an order of using the broadband over power line communication link and the wireless communication for the terrestrial data transmission between the aircraft and the external network.

19. The system of claim 1, wherein the broadband over powerline module includes a GPS receiver for verifying that the broadband over powerline module has not been moved from a predetermined position.

20. The system of claim 1, wherein the broadband over powerline module is configured with a secure routing table that facilitates routing information via the external network using pre-determined hops and/or pre-determined destinations.

21. The system of claim 1, wherein the electrical power cable operates at different frequency from the frequency of power lines used for an upstream supply of power in order to provide further data security in the electrical power cable.

22. A system for terrestrial data transmission between an aircraft and an external network, the system comprising:
the aircraft comprising:
an aircraft broadband over power line module, configured to transmit data to and from the external network through an electrical power cable using a broadband over power line communication link;
a wireless communication module, configured to wirelessly transmit data to and from the external network using a wireless communication link; and
a communication link manager,
a gate comprising a gate broadband over power line module communicatively coupled to the external network, wherein the communication link manager is configured to initiate and control data transmission between the aircraft broadband over power line module and the external network using the broadband over power line communication link and between the wireless communication module and the external network using the wireless communication link based on propagation of a broadband over power line signal at the gate; and
an electrical power cable extending between the aircraft and the gate and configured to deliver an electrical power from the gate to the aircraft,
wherein both the aircraft broadband over power line module and the gate broadband over power line module are inductively coupled to the electrical power cable and configured to transmit data between the aircraft broadband over power line module and the gate broadband over power line module, and
wherein the communication link manager is configured to select a frequency band for the broadband over power line communication link based on a length of the electrical power cable and based on a data rate transfer expected through the broadband over power line communication link, wherein the communication link manager is further configured to choose whether to use the wireless communication module, the broadband over power line module, or a combination of the two, the choosing being based upon a variety of parameters including availability, speed, security, and costs, and wherein the communication link manager is further configured to, if the combination of the two is chosen, determine an order of using the wireless communication module or the broadband over power line module based on the variety of parameters.

23. A method for terrestrial data transmission between an aircraft and an external network, the method comprising:
    connecting an aircraft to a gate, the aircraft comprising:
        an aircraft broadband over power line module, inductively coupled to an electrical receptacle of the aircraft and configured to transmit data to and from the external network through an electrical power cable, when the electrical power cable is connected to the aircraft and a gate, using a broadband over power line communication link;
        a wireless communication module, configured to wirelessly transmit data to and from the external network using a wireless communication link; and
        a communication link manager, configured to initiate and control data transmission between the aircraft broadband over power line module and the external network using the broadband over power line communication link and between the wireless communication module and the external network using the wireless communication link based on propagation of a broadband over power line signal at the gate, wherein the communication link manager is further configured to choose whether to use the wireless communication module, the broadband over power line module, or a combination of the two, the choosing, being based upon a variety of parameters including, availability, speed, security, and costs, and wherein the communication link manager is further configured to, if the combination of the two is chosen, determine an order of using the wireless communication module or the broadband over power line module based on the variety of parameters,
        wherein the communication link manager is configured to select a frequency band for the broadband over power line communication link based on a length of the electrical power cable and based on a data rate transfer expected through the broadband over power line communication link, and
    the gate comprising a gate broadband over power line module communicatively coupled to the external network and inductively coupled to the electrical power cable; and
    wherein connecting the aircraft to the gate comprises connecting the electrical power cable to the electrical receptacle of the aircraft thereby establishing the broadband over power line communication link between the aircraft broadband over power line module and the gate broadband over power line module; and
    selecting one or both of the aircraft broadband over power line module and the wireless communication module for data communication between the aircraft and the external network using the communication link manager based on propagation of a broadband over power line signal at the gate.

* * * * *